(12) United States Patent
Kadosh (10) Patent No.: US 8,091,205 B2
(45) Date of Patent: Jan. 10, 2012

(54) CARTRIDGE ADJUSTMENT TOOL FOR A SLOTTING CUTTER

(75) Inventor: Shimon Kadosh, Nahariya (IL)

(73) Assignee: Iscar, Ltd., Tefen (IL)

( * ) Notice: Subject to any disclaimer, the term of this patent is extended or adjusted under 35 U.S.C. 154(b) by 455 days.

(21) Appl. No.: 12/397,502

(22) Filed: Mar. 4, 2009

(65) Prior Publication Data

US 2009/0249607 A1    Oct. 8, 2009

(30) Foreign Application Priority Data

Apr. 8, 2008 (IL) .......................... 190734

(51) Int. Cl.
*B23Q 3/00* (2006.01)
*B26D 1/12* (2006.01)

(52) U.S. Cl. .......................... 29/468; 407/39

(58) Field of Classification Search .................... 29/468, 29/467, 464, 462, 428, 407.09, 564.2, 271, 29/281.4; 407/39
See application file for complete search history.

(56) References Cited

U.S. PATENT DOCUMENTS

| | | | |
|---|---|---|---|
| 2,997,081 A * | 8/1961 | Christophersen | 144/134.1 |
| 3,604,122 A | 9/1971 | Dupuis et al. | |
| 6,062,775 A | 5/2000 | Satran et al. | |
| 6,488,456 B1 | 12/2002 | Satran et al. | |
| 6,971,823 B2 | 12/2005 | Satran et al. | |

FOREIGN PATENT DOCUMENTS

| | | |
|---|---|---|
| DE | 448 962 | 9/1927 |
| DE | 2 144 458 | 3/1972 |
| GB | 876178 | 9/1961 |

* cited by examiner

*Primary Examiner* — John C Hong
(74) *Attorney, Agent, or Firm* — Womble Carlyle (57) ABSTRACT

The present invention provides a cartridge adjustment tool for adjusting the axial position of cartridges of a slotting cutter. The adjustment mechanism has a body axis of rotation and comprises a body peripheral surface that extends between a body front surface and a body rear surface. The body is provided with threaded through bores, each of which receives therein a threaded portion of a threaded bolt. When the adjustment mechanism is mounted on a mutual arbor with a slotting cutter having cartridges, each of the threaded bolts is opposite a force engagement area of the associated cartridge. By turning the head portion of the threaded bolts, each of the cartridges is axially displaced and the axial position of each of the cartridges may be individually set.

6 Claims, 7 Drawing Sheets

CARTRIDGE ADJUSTMENT TOOL FOR A SLOTTING CUTTER

FIELD OF THE INVENTION

The present invention relates to an adjustment mechanism for adjusting the axial position of cartridges of a slotting cutter.

BACKGROUND OF THE INVENTION

Slotting cutters having cutting inserts mounted in cartridges are known. Such slotting cutters are found, for example, in U.S. Pat. No. 6,062,775, U.S. Pat. No. 6,488,456 and U.S. Pat. No. 6,971,823. A typical slotting cutter of such a kind comprises a slotting cutter tool body with a disc like shape having a cutter axis of rotation. The slotting cutter tool body has a peripheral surface that extends between a front surface and a rear surface. A plurality of cartridge pockets are formed along the peripheral surface of the slotting cutter tool body. A cartridge is mounted in each of the cartridge pockets. A cutting insert is retained within an insert pocket in each of the cartridges.

There are several types of slotting cutters that differ from one another according to their function. A first type of slotting cutter has cartridges having cutting inserts mounted in insert pockets such that the cutting inserts cut in the peripheral direction of the slotting cutter for performing, for example, a slot or for milling a narrow face.

Figure 2:
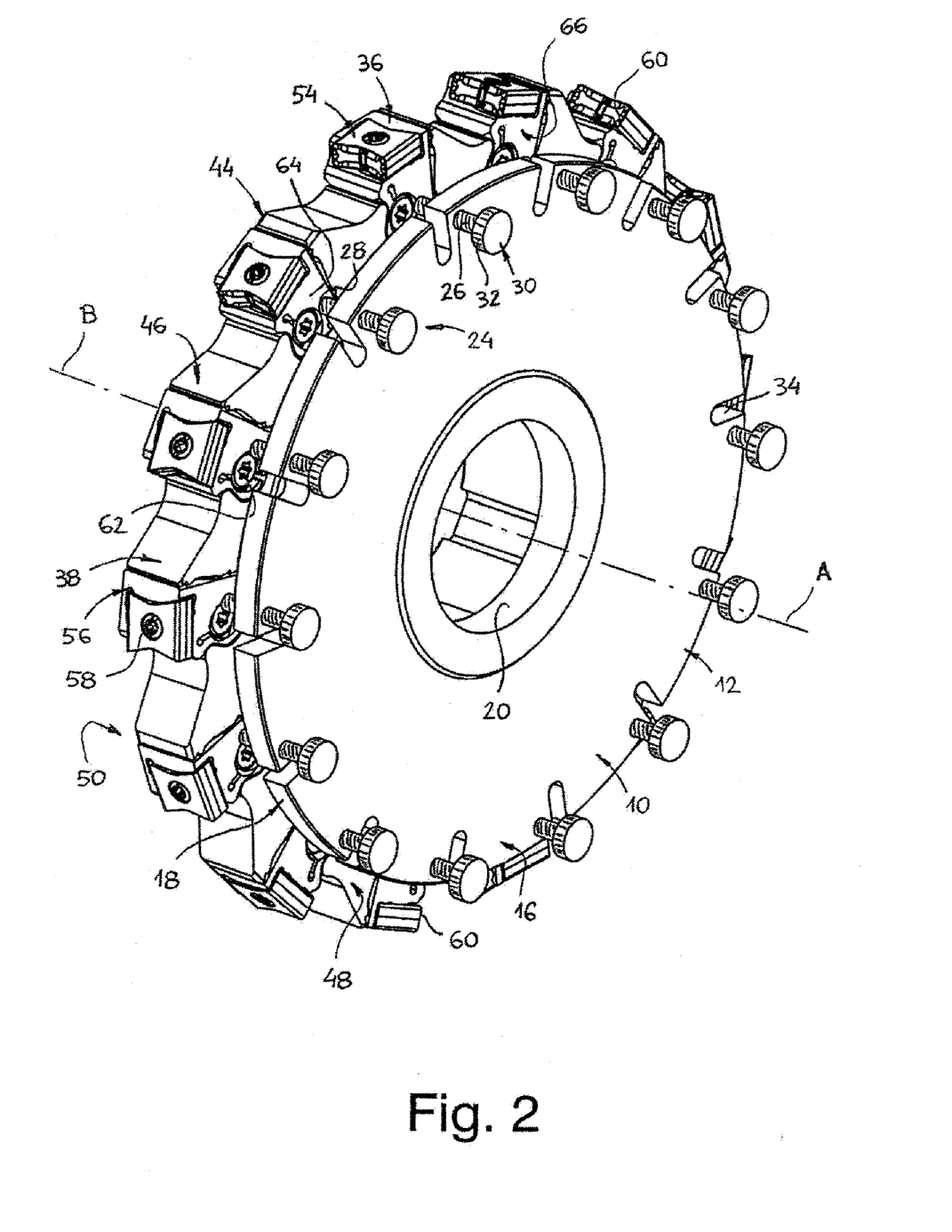
FIG. 2 is a perspective view of the cartridge adjustment tool of FIG. 1 mounted on a slotting cutter in an adjustment position.
Figure 3:
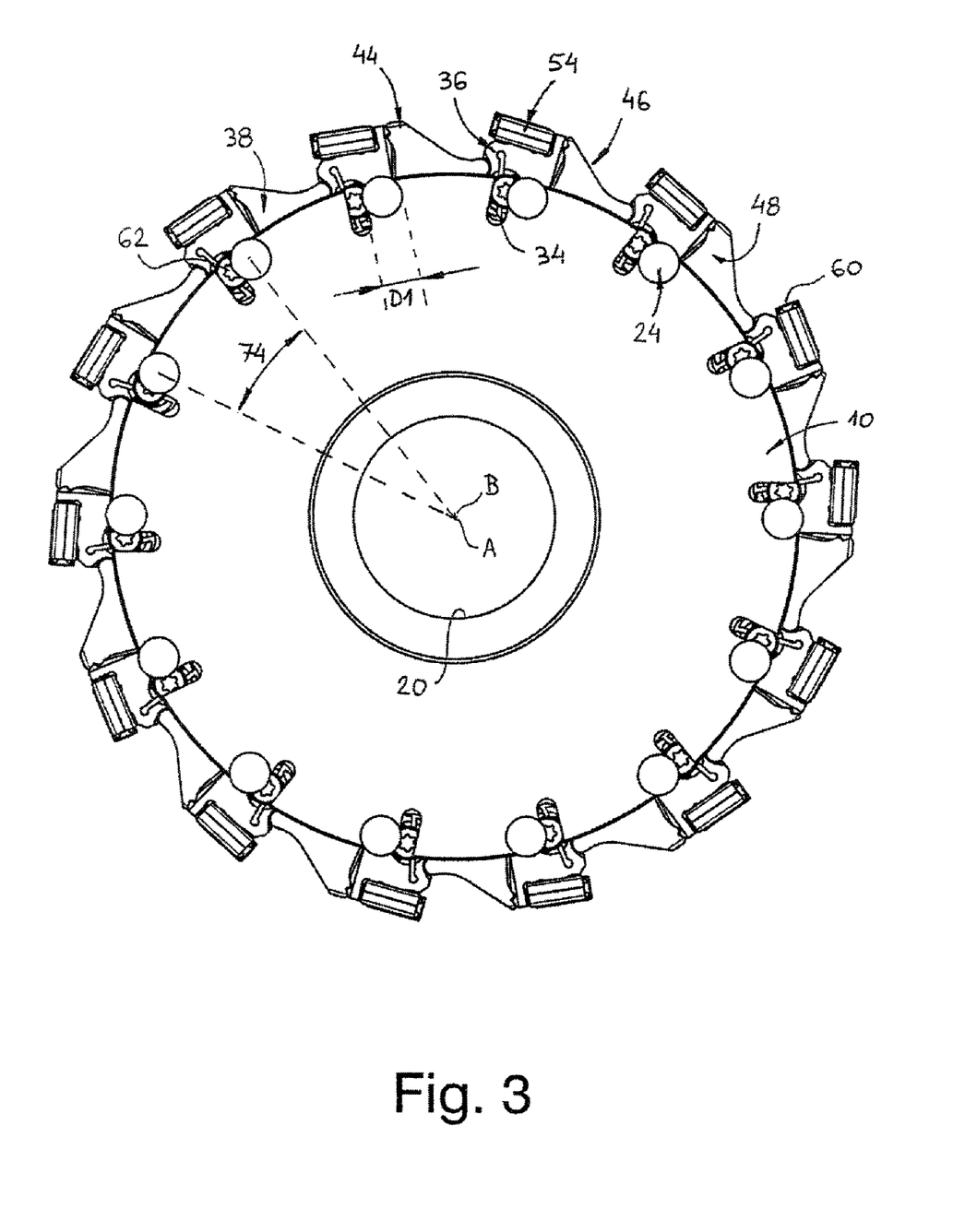
FIG. 3 is an end view of the cartridge adjustment tool and the slotting cutter of FIG. 2.
Figure 4:
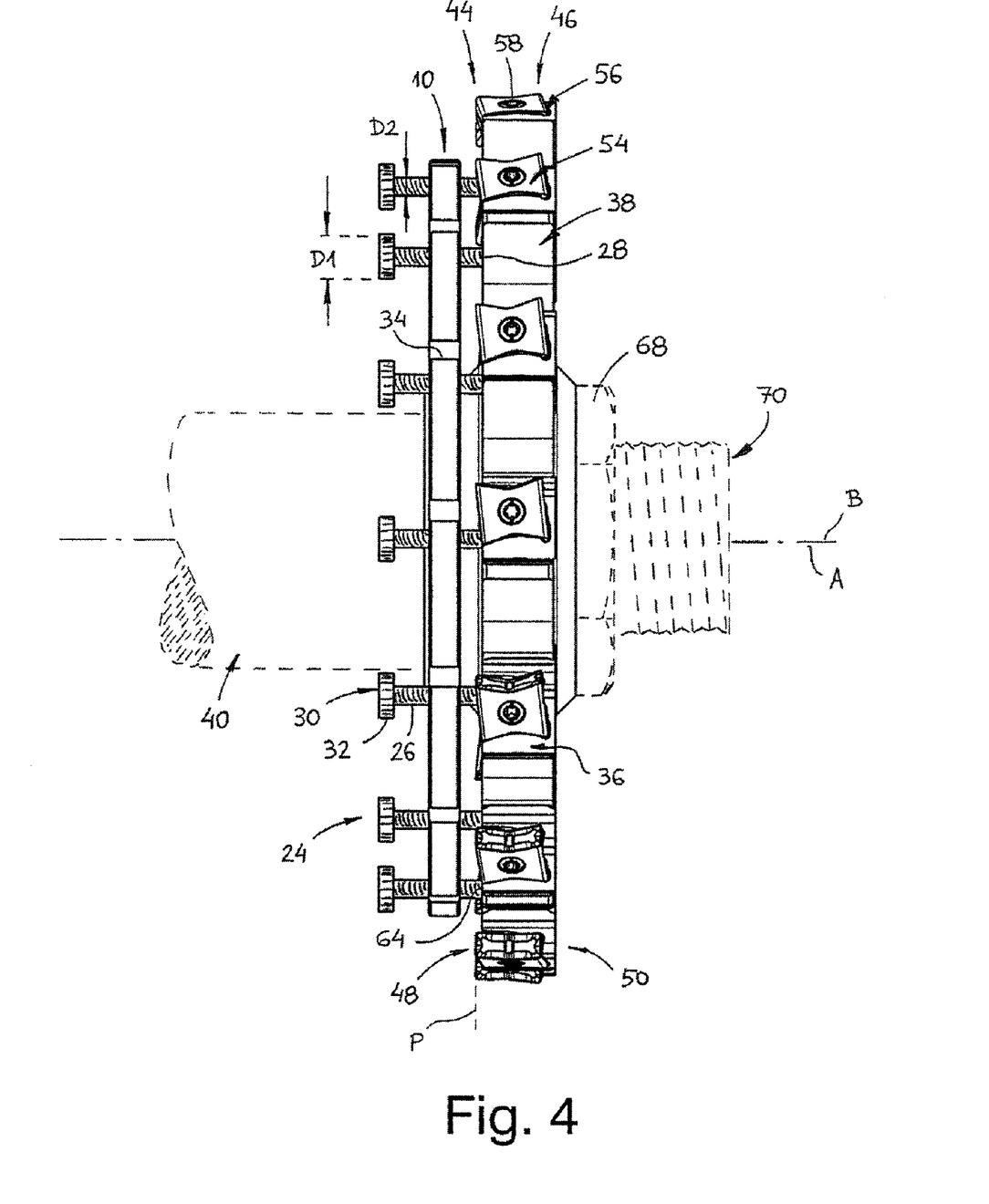
FIG. 4 is a side view of the cartridge adjustment tool and the slotting cutter of FIG. 2.

A second type of slotting cutter has cartridges having cutting inserts mounted in insert pockets such that the cutting inserts cut adjacent one side of the slotting cutter, i.e., adjacent its front surface or its rear surface, as shown, for example, in the slotting cutters of FIGS. 2 and 4. This type of mounting may be used for milling a side wall of a pocket or cavity, or, to perform face milling when the axis of rotation of the slotting cutter is positioned perpendicular to the face of the machined workpiece.

Figure 5:
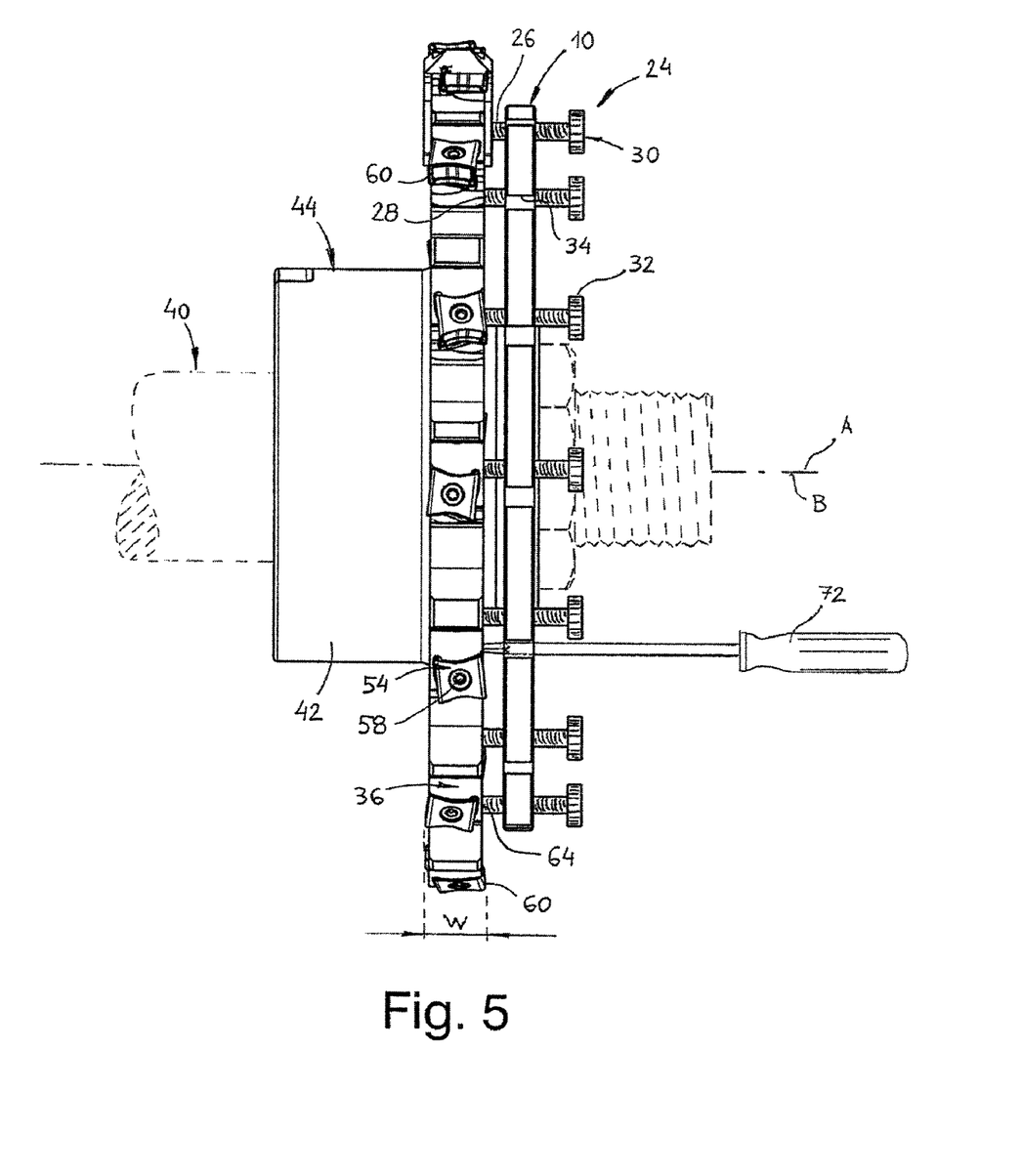
FIG. 5 is a side view of the cartridge adjustment tool of FIG. 1 mounted on an "F type" slotting cutter.

A third type of slotting cutter, as shown for example in FIG. 5, has cutting inserts mounted within insert pockets in corresponding cartridges that are alternatingly arranged around the peripheral surface of the slotting cutter. In such an arrangement a given cartridge retains a cutting insert that cuts adjacent the front surface of the slotting cutter tool body, and, a succeeding cartridge retains a cutting insert that cuts adjacent the rear surface of the slotting cutter tool body. This type of slotting cutter may be used to mill both shoulders of a slot as well as the bottom of the slot.

Since the slot should be milled to a specific width dimension, it is essential that the axial distance between the axially oriented cutting edges of two consecutive cutting inserts (see numeral W in FIG. 5) be accurately set. Furthermore, there are types of cartridges that can be axially adjusted so that different width slots may be cut with the same slotting cutter. To this purpose it is also essential to accurately adjust the axial position of each of the cartridges with respect to the slotting cutter tool body and with respect to each other.

The slotting cutter tool body generally comes with two different types of adapters, referred to herein as "S-type" and "F-type" adapters. An "S-type" adapter is a central opening centered at the slotting cutter's axis of rotation, designed to receive an arbor connected to a spindle. An "F-type" adapter is a generally cylindrical central protrusion at the slotting cutter's central opening constituting an arbor for connecting to a spindle.

In order to assemble the cartridges on the slotting cutter tool body and to adjust them to a desired position, as known in the art, the slotting cutter tool body is mounted on an arbor of an assembling device. Then, a cartridge is mounted in one of the cartridge pockets. In order to adjust the cartridge into the desired axial position with respect to the slotting cutter tool body, the cartridge is knocked directly by a hammer or through the aid of another tool in a forward or rearward axial direction until the desired position, shown by a measurement tool, is reached. After the position of the first cartridge, or of the first two cartridges in case of an alternating cartridges slotting cutter, is reached, the rest of the cartridges can be mounted on the slotting cutter tool body and adjusted in a similar manner with respect to the first assembled cartridge or cartridges that serve as reference cartridges.

Such an adjustment method is very time consuming since the axial displacement of a given cartridge with respect to the slotting cutter tool body, caused by each knock of the hammer or another tool, cannot be accurately estimated. Therefore, even when the adjustment is carried out by a trained worker, there are usually several steps required in order to bring the cartridge into the desired position. This is a difficult task since the size of the required displacement of the cartridge is typically in the range of 0.005 mm to 0.020 mm. With such small displacements required, even a slight knock by the hammer may over-shoot the required displacement in a given axial direction thus forcing the worker to move the cartridge to the opposite axial direction. Practically, the back and forth adjustment may require several stages, an action that may be more time consuming and nerve racking when tight tolerances of assembling are required.

It is the object of the present invention to provide a cartridge adjustment tool for adjusting the axial positioning of cartridges of a slotting cutter that significantly reduces or overcomes the aforementioned disadvantages.

It is a further object of the present invention to provide a cartridge adjustment tool for adjusting the axial position of a single cartridge with respect to the slotting cutter tool body on which it is mounted.

It is still a further object of the present invention to provide a cartridge adjustment tool for adjusting the axial position of all the cartridges mounted on a slotting cutter tool body with respect to a reference cartridge mounted on the slotting cutter tool body.

It is yet a further object of the present invention to provide a cartridge adjustment tool that may be used with different types of slotting cutter tool bodies having different types of adapters such as "L-type" and "S-type" adapters.

SUMMARY OF THE INVENTION

In accordance with the present invention there is provided a cartridge adjustment tool having a body axis of rotation and comprising:
a body having a body peripheral surface extending between a body front surface and a body rear surface;
a plurality of adjustment elements, each of the adjustment elements having a protruding section that protrudes at least axially forwardly with respect to the body front surface, and having a first engagement member associated with the body; wherein
axial displacement of the protruding section of each of the adjustment elements may be individually adjusted.

Typically, the adjustment elements are similarly radially disposed with respect to the body axis of rotation.

Further typically, each of the adjustment elements is similarly angularly displaced with respect to the preceding adjustment element.

According to some embodiments, each of the adjustment elements is associated with a body peripheral opening that extends between the body front surface and the body rear surface.

If desired, each body peripheral opening is a slot that extends radially inwardly from the body peripheral surface.

In one embodiment, the first engagement member associated with the body is a threaded bore and each of the adjustment elements is a threaded bolt that threadingly engages an associated threaded bore in the body.

The protruding section of each of the adjustment elements is a forward threaded portion of a threaded bolt.

According to some embodiments, the threaded bolts protrude axially rearwardly from the rear surface.

If desired, each of the threaded bolts has a bolt head, and a peripheral surface of the bolt head is knurled.

Typically, the body is provided with a body central through bore.

Further in accordance with the present invention there is provided a method for axially aligning a plurality of cartridges mounted on a slotting cutter tool body, the method comprising the steps of:

(a) mounting a cartridge adjustment tool on a mutual arbor with the slotting cutter tool body;
(b) aligning a plurality of adjustment elements protruding forwardly from a body of the cartridge adjustment tool opposite a force engagement area at each of the cartridges to be axially aligned thus setting a proper angular orientation between the cartridge adjustment tool and the slotting cutter tool body;
(c) fixing the cartridge adjustment tool to the slotting cutter tool body in the proper angular orientation therebetween;
(d) axially displacing a given adjustment element to exert on the force engagement area of the opposite cartridge a force in an axial direction of movement of the cartridge, and displacing the cartridge until it reaches a desired location;
(e) tightening the cartridge at the desired location; and
(f) repeating steps (d) and (e) with a succeeding cartridge.

If desired, the method for axially aligning a plurality of cartridges mounted on a slotting cutter tool body further comprises between steps (e) and (f) the step of:
rotating the arbor together with the cartridge adjustment tool and the slotting cutter tool body at an angle corresponding to an angular displacement between two succeeding cartridges.

Further in accordance with the present invention there is provided a cartridge adjustment tool for adjusting the axial position of a cartridge with respect to a slotting cutter tool body, the cartridge adjustment tool comprising:

a frame adapted to be mounted on the slotting cutter tool body;
at least one adjustment element protruding from the frame; wherein
displacement of the at least one adjustment element with respect to the frame may be adjusted.

If desired, the displacement of the at least one adjustment element may be axially adjusted with respect to the frame.

When the cartridge adjustment tool is mounted on the slotting cutter tool body then axial displacement of the at least one adjustment element with respect to a force engagement area of the cartridge causes axial displacement of the cartridge.

Further in accordance with the present invention there is provided a cartridge adjustment tool for adjusting the axial position of a cartridge with respect to a slotting cutter tool body, the cartridge adjustment tool comprising:

a frame having a shape adapted to be mounted in a substantial radial direction on the slotting cutter body, and extending along a cutter front surface and a cutter rear surface;
adjustment elements protruding axially inwardly of the frame; wherein
axial displacement of each of the adjustment elements may be individually adjusted.

Typically, each of the adjustment elements is a threaded bolt that threadingly engages a threaded bore in the frame.

Practically, the frame is provided with means for fixing the position of the frame with respect to both sides of the slotting cutter body.

Advantageously, the adjustment elements apply an axially forward force or an axially rearward force on a cartridge mounted on the slotting cutter tool body.

If desired, the frame has side plates that define a frame opening therebetween, and
the frame is detachable so that the frame opening may be adjusted to a desired value.

Further in accordance with the present invention there is provided a method for axially aligning a cartridge mounted on a slotting cutter tool body, the method comprising the steps of:

(a) mounting a cartridge adjustment tool on the slotting cutter tool body;
(b) aligning adjustment elements protruding inwardly from a frame of the cartridge adjustment tool opposite a force engagement area of the cartridge to be axially aligned;
(c) fixing the frame of the cartridge adjustment tool to the slotting cutter tool body by means of fixing means;
(d) axially displacing the adjustment elements to exert on the force engagement area of the cartridge a force in a desired direction of movement of the cartridge, and displacing the cartridge until it reaches a desired location; and
(e) tightening the cartridge at the desired location by cartridge tightening means.

BRIEF DESCRIPTION OF THE DRAWINGS

For a better understanding of the present invention and to show how the same may be carried out in practice, reference will now be made to the accompanying drawings, in which.

DETAILED DESCRIPTION OF THE INVENTION

Attention is first drawn to FIGS. 1 to 5 showing a cartridge adjustment tool 10 in accordance with a first embodiment of the present invention. The cartridge adjustment tool 10 comprises a disc shaped body 12 having a body front surface 14, a body rear surface 16 and a body peripheral surface 18 extending therebetween. The cartridge adjustment tool 10 has rotational symmetry around a body axis of rotation A. The cartridge adjustment tool 10 also has a mounting portion in the form of a body central through bore 20, symmetrical with respect to the body axis of rotation A, that extends between the body front surface 14 and the body rear surface 16.

Figure 1:
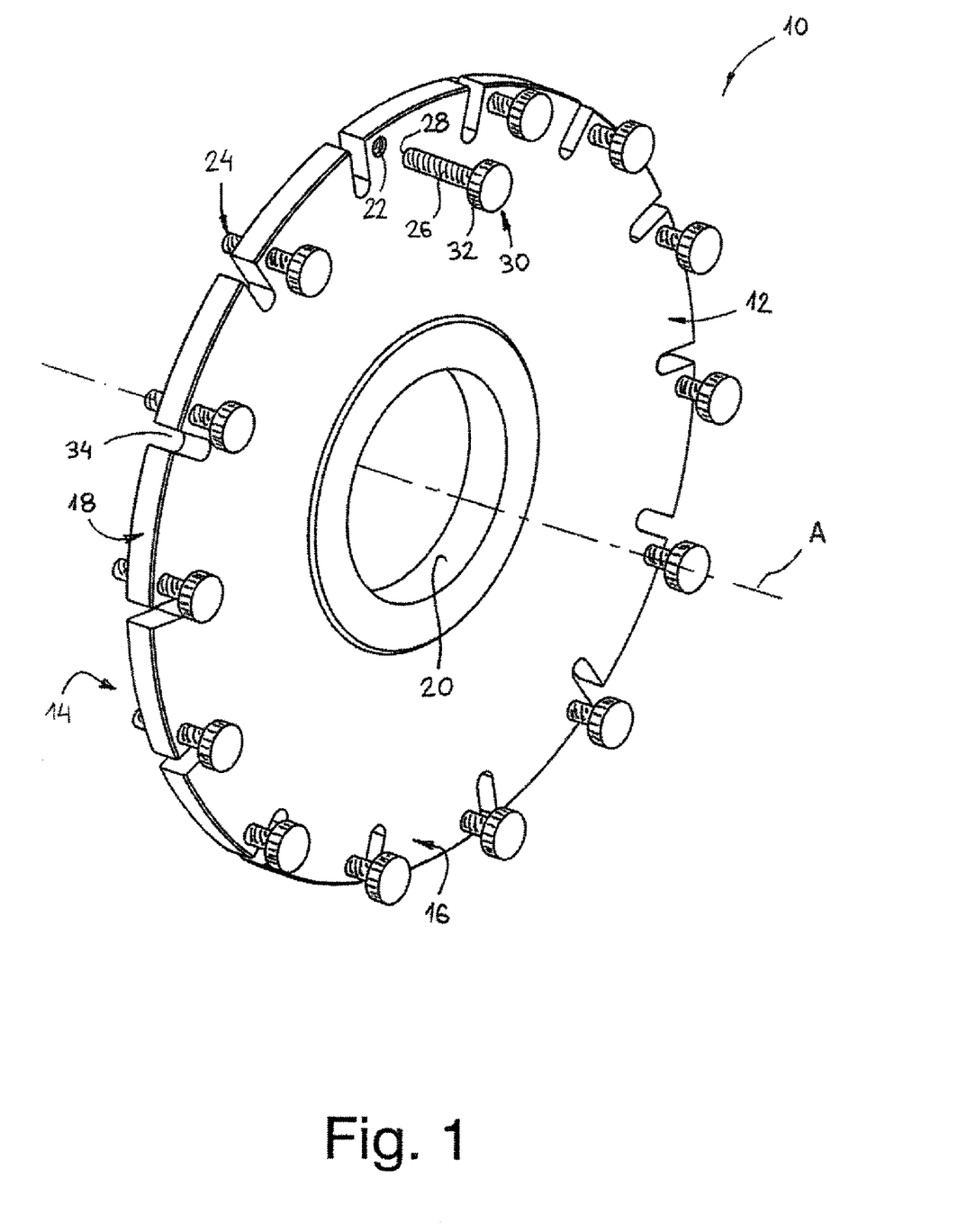
FIG. 1 is a perspective view of a cartridge adjustment tool in accordance with the present invention.

The body is provided with a plurality of threaded through bores 22 which extend from the body front surface 14 to the body rear surface 16. The threaded through bores constitute a first engagement member associated with the body. In one embodiment, the threaded through bores 22 are similarly radially disposed with respect to the body axis of rotation A, i.e., they lie on an imaginary circle (not shown in the figures) centered about the body axis of rotation A. Furthermore, each of the threaded through bores 22 is typically similarly angularly displaced with respect to the preceding threaded through bore 22, or in other words, the threaded through bores 22 are evenly spaced apart from one another along the aforementioned imaginary circle. According to a specific embodiment of the present invention, the threaded through bores 22 are located in the vicinity of the body peripheral surface 18.

A threaded bolt 24, constituting an adjustment element, is threadingly engaged into each of the threaded through bores 22. Each of the threaded bolts 24 has a threaded portion 26, having a front end 28, and a head portion 30 which typically has a head diameter D1 that is larger than a thread diameter D2 of the threaded portion 26. The head portion 30 has a head peripheral surface 32 that may be knurled for comfort grabbing of the head portion 30 by hand and turn it as necessary.

The threaded bolt 24 is inserted into the associated threaded through bore 22 from the body rear surface 16, threadingly engaging the threaded through bore 22, and protruding forwardly with respect to the body front surface 14. Turning the head portion 30 of the threaded bolt 24 in a clockwise or an anticlockwise direction changes the axial displacement of the front end 28 of the threaded portion 26 with respect to the body front surface 14. Thus, each threaded bolt 24 is threadingly coupled to the body 12 in the vicinity of the body peripheral surface 18, each threaded adjustment bolt 24 being independently axially adjustable relative to the body 12 and having a front end 28 capable of protruding axially forwardly with respect to the body front surface 14.

In order to be able to adjust slotting cutters having different types of adapters, as will be later described, a slot 34, constituting a body peripheral opening, is formed in the vicinity of each of the threaded through bores 22. Each slot 34 extends between the body front surface 14 and the body rear surface 16. Furthermore, each slot 34 extends radially inwardly from the body peripheral surface 18.

The method for axially aligning a plurality of cartridges 36 mounted on a slotting cutter tool body 38 will now be described. The method described herein teaches how to align the cartridges 36 with respect to the slotting cutter tool body 38 or with respect to other cartridges, depending on the measuring instruments used for setting the correct alignment (not shown in the drawings). Optionally, the cartridges 36 may be aligned with respect to a reference cartridge 36 that has been previously set to a desired position. The reference cartridge 36 may be set to its desired position by a different cartridge adjustment tool that will be later described.

At a first stage, the cartridge adjustment tool 10 is mounted, via its body central through bore 20, on a mutual arbor 40 (shown by dashed lines in FIGS. 4 and 5) together with the slotting cutter tool body 38 such that the body axis of rotation A of the cartridge adjustment tool 10 coincides with a cutter axis of rotation B. This results in the cartridge adjustment tool 10 being mounted coaxially, and in spaced relation, with the slotting cutter tool body 38, such that the body front surface 14 faces the slotting cutter tool body 38. For the convenience of cartridge alignment, the arbor 40 is typically positioned horizontally and is capable of being freely rotated by hand. The relative direction between the cartridge adjustment tool 10 and the slotting cutter tool body 38, as well as the order of assembling them on the arbor 40, depends mainly on the type of adapter 42 the slotting cutter tool body 38 has.

FIG. 2 shows a slotting cutter 44 mounted on a mutual arbor 40 (shown in FIGS. 4 and 5) with the cartridge adjustment tool 10. The slotting cutter 44 comprises a slotting cutter tool body 38 having a disc like shape and a cutter axis of rotation B. The slotting cutter tool body 38 has a cutter peripheral surface 46 that extends between a cutter front surface 48 and a cutter rear surface 50. A plurality of cartridge pockets 52 (seen clearly in FIG. 7) are formed along the cutter peripheral surface 46. A cartridge 36 is mounted in each of the cartridge pockets 52. A cutting insert 54 is securely retained within an insert pocket 56 in each of the cartridges 36 by means of an insert retaining screw 58. The slotting cutter 44 of FIG. 2 is single sided. That means that a side active cutting edge 60 of all the cutting inserts 54 faces the same direction, the cutter front surface 48 in this case.

Each of the cartridges 36 is retained to its cartridge pocket 52 by means of a cartridge retaining screw 62. In the embodiment shown, the cartridge retaining screw 62 extends generally in an axial direction. However, according to other types of cartridges, the cartridge retaining screw may extend generally in a radial direction. Before the cartridges 36 are adjusted, they are first mounted in their respective cartridge pockets 52 with a roughly axial alignment therebetween, and the cartridge retaining screws 62 are not fully tightened so that each cartridge may still be slightly axially displaced, as needed.

At a second stage, the cartridge adjustment tool 10 is rotated with respect to the slotting cutter 44 around the body axis of rotation A until the front end 28 of the threaded portion 26 of a threaded bolt 24 is opposite a force engagement area 64 of a cartridge 36. The force engagement area 64 of the cartridge 36 is an axially directed surface at the side 66 of the cartridge 36 that, when subjected to an axially directed force, enables easy and fluent axial displacement of the cartridge 36. By aligning the threaded bolts 24 opposite their associated force engagement areas 64, the proper angular orientation between the cartridge adjustment tool 10 and the slotting cutter 44 is obtained.

At a third stage, the cartridge adjustment tool 10 is fixed to the slotting cutter tool body 38 by, for example, a clamping nut 68 or a bushing (shown for illustration as dashed lines in FIG. 4) that is mounted on the mutual arbor 40 from an open end 70 thereof. Thus, the cartridge adjustment tool 10 is fixed in the proper angular orientation with respect to the slotting cutter tool body 38.

At a fourth stage, the head portion 30 of a given threaded bolt 24 is rotated until the front end 28 of the threaded portion 26 touches the force engagement area 64 of the cartridge 36 positioned opposite the active threaded bolt 24. Then, further rotation of the head portion 30 exerts a force on the force engagement area 64 of the cartridge 36 and causes an axial displacement of the cartridge 36, thereby urging the cartridge 36 towards a desired location. At this stage, the displacement of the cartridge 36 is monitored by a suitable measuring instrument (not shown in the figures). When the cartridge 36 reaches the desired location, or, more particularly, when the side active cutting edge 60 of the cutting insert 54 retained in the cartridge 36 reaches the desired location, which can be represented by a reference plane P that is perpendicular to the cutter axis of rotation B, then, the rotation of the head portion 30 of the threaded bolt 24 is stopped.

At a fifth stage, the cartridge 64 is tightened by fully tightening the cartridge retaining screw 62 by means of a suitable screwdriver 72 (shown in FIG. 5), to thereby secure the cartridge 36 in its final position.

At a sixth stage, the arbor is rotated together with the cartridge adjustment tool and the slotting cutter tool body at an angle corresponding to an angular displacement 74 (shown in FIG. 3) between two succeeding cartridges 36. Now, the fourth and fifth stages are repeated with the succeeding cartridge 36, namely, axially displacing the cartridge 36 until it reaches the desired position and then fully tightening the cartridge retaining screw 62 to fix the cartridge 36 in the desired position. This stage is repeated until all the cartridges 36 are fixed at the desired position.

The method for adjusting the axial position of the cartridges 36 is advantageous since the axial displacement of a single cartridge 36 can be easily and accurately monitored thus the time required for adjusting the axial position of the cartridges 36 mounted on a slotting cutter tool body 38 may be significantly reduced. A trained person gets used to the, so called, conversion rate between the amount of angular rotation of the head portion 30 and the axial displacement of the cartridge 36 caused by that angular rotation. Thus, for a required displacement of the cartridge 36, the person doing the adjustment knows how much angular rotation of the head portion 30 he should apply, thus avoiding over-displacement of the cartridge 36, which may require that one displace the cartridge 36 back in the opposite direction, which wastes time.

Another advantage obtained by the use of the cartridge adjustment tool 10 according to the present invention is the improved accuracy in the position of the cartridges 36. This is due to the fact that hammer knockings on the cartridges 36, as well as shakings and vibrations on the entire arbor 40 and measurement system, as used in the prior art, are avoided.

When the slotting cutter tool body 38 is provided with an "F-type" adapter, as shown, for example, in FIG. 5, the cartridge adjustment tool 10 may be mounted against the slotting cutter tool body 38, in a side opposite the side having the "F-type" adapter.

When the slotting cutter tool body 38 is provided with an "S-type" adapter, as shown, for example, in FIG. 4, the cartridge adjustment tool 10 may be mounted against the slotting cutter tool body 38, in any one of the sides of the slotting cutter tool body 38.

The cartridge retaining screws 62 are typically mounted at the side 66 of the cartridge 36 which is easier accessible for a screwdriver 72 to be used for tightening the cartridge retaining screw 62. When the direction of the cartridges 36 is alternatingly arranged, as shown for example in FIG. 5, the cartridge retaining screws 62 are typically arranged at the same side in order to enable easy adjustment of the cartridges 36 and easy tightening of the cartridge retaining screws 62.

Thus, when the cartridge adjustment tool 10 is mounted against the slotting cutter tool body 38 in the side opposite to where the cartridge retaining screws 62 lie, then, the cartridge retaining screws 62 are freely accessible by the screwdriver 72. This is shown for example in FIG. 4, without seeing the cartridge retaining screws 62 that may be located at the side opposite to where the cartridge adjustment tool 10 is mounted. On the other hand, when the cartridge adjustment tool 10 is mounted against the slotting cutter tool body 38 in the same side where the cartridge retaining screws 62 lie (as shown for example in FIG. 5), then, the cartridge retaining screws 62 are accessible to the screwdriver 72 through the slots 34 provided in the body peripheral surface 18.

Attention is now drawn to FIGS. 6 to 9. When it is required to adjust the axial position of a single cartridge 36 with respect to the slotting cutter tool body 38, another adjustment mechanism is used and will be hereinafter called an individual cartridge adjustment tool 76.

Figure 8:
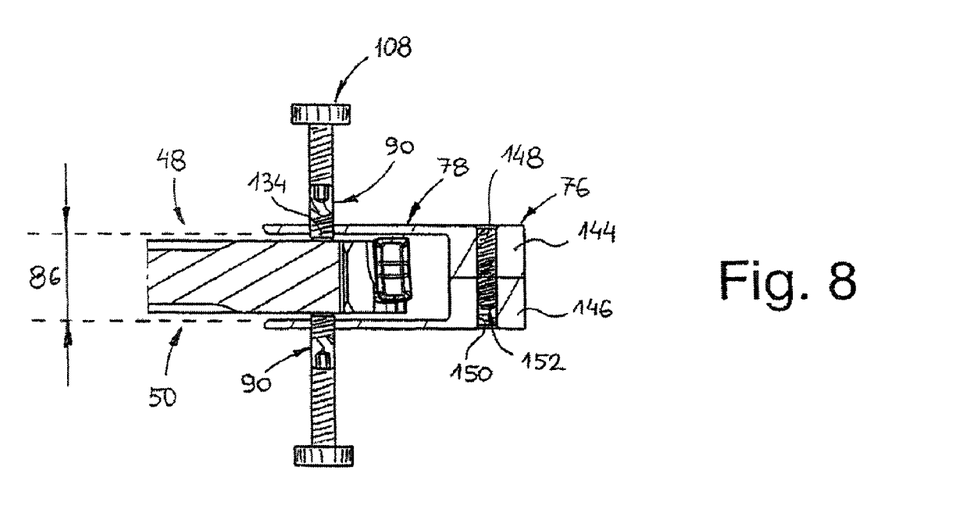
FIG. 8 is a cross-sectional view of the cartridge adjustment tool and slotting cutter tool body taken along line VIII-VIII in FIG. 7.
Figure 9:
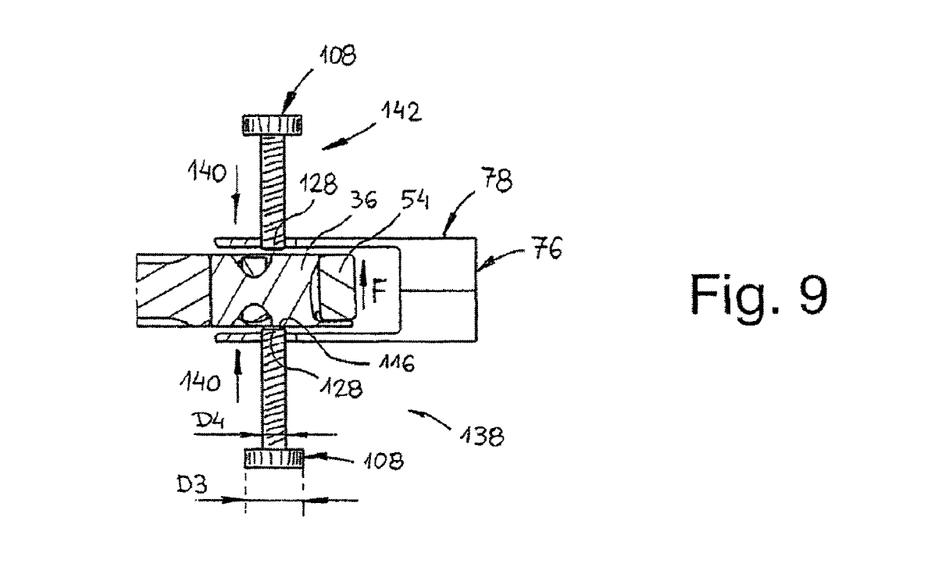
FIG. 9 is a cross-sectional view of the cartridge adjustment tool and slotting cutter tool body taken along line IX-IX in FIG. 7.

The individual cartridge adjustment tool 76 comprises a U-shaped frame 78 as seen, for example, in FIGS. 8 and 9. The frame 78 has two opposing side plates 80 that are connected by a frame central portion 82 at a first portion 84 of the side plates 80. The thickness of the frame central portion 82 determines a frame opening 86 (see FIGS. 6 and 8).

The individual cartridge adjustment tool 76 is provided with a mounting portion in the form of second portions 88 of the side plates 80, which second portions 88 are remote from their respective first portions 84. The second portions 88 are provided with means for fixing the position of the frame 78 with respect to the cutter front surface 48 and the cutter rear surface 50 when the individual cartridge adjustment tool 76 is mounted on the slotting cutter tool body 38. The fixing means according to a specific embodiment of the present invention are fixing screws 90. Each of the fixing screws 90 may be a grub screw having a threaded portion 92 that extends between an Allen type head 94 and a front end 96 of the fixing screw 90.

Figure 6:
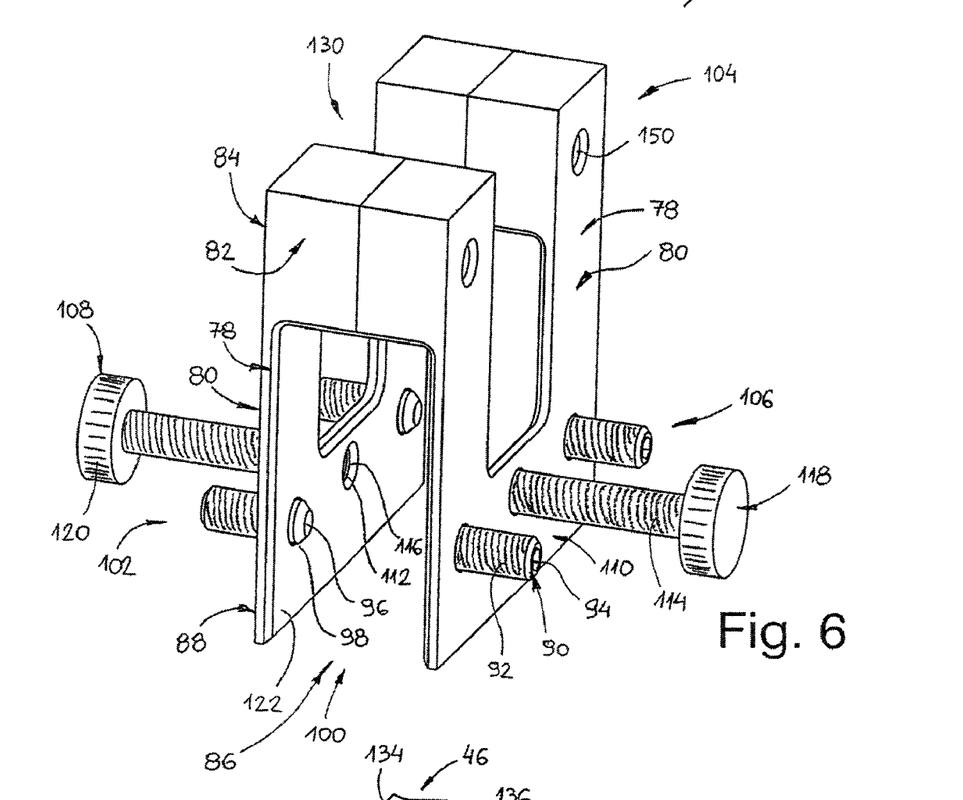
FIG. 6 is a perspective view of a cartridge adjustment tool for adjusting the axial position of a cartridge with respect to a slotting cutter tool body.

The fixing screws 90 are threadingly engaged into fixing threaded bores 98 provided in the side plates 80 of the frame 78. As seen in FIG. 6, a leading portion 100 of the frame 78 is provided with a leading pair 102 of fixing screws 90, each one of the fixing screws 90 is opposing the other fixing screw 90 and threadingly engages a fixing threaded bore 98 of a different side plate 80. Similarly, a trailing portion 104 of the frame 78 is provided with a trailing pair 106 of fixing screws 90.

Threaded adjustment bolts 108, being adjustment elements of the individual cartridge adjustment tool 76, are located in an intermediate portion 110 of the frame 78 and threadingly engage into adjustment threaded bores 112. Each of the adjustment threaded bores 112 is formed at a different side plate 80, opposing the other adjustment threaded bore 112.

Each of the threaded adjustment bolts 108 has a threaded portion 114, ending in a front end 116 of the threaded adjustment bolt 108 that protrudes axially inwardly from the frame 78, and a head portion 118 which typically has a head diameter D3 that is larger than a thread diameter D4 of the threaded portion 114. The head portion 118 has a head peripheral surface 120 that may be knurled to facilitate grabbing the head peripheral surface 120 by hand and turning it as necessary.

It can thus be seen from the foregoing, that the frame's 78 spaced apart second portions 88 define a frame opening 86 therebetween. Furthermore, these spaced apart portions 88 are configured to be secured to the cutter front surface 48 and cutter rear surface 50 by the fixing screws 90 when the frame 78 straddles at least a portion of the cutter periphery. Additionally, the threaded adjustment bolts 108 are threadingly coupled to the frame 78, protrude into the frame opening 86 from opposite directions and are arranged to travel along a direction between the spaced apart portions 88.

The method for axially aligning a cartridge 36, with respect to a slotting cutter tool body 38 upon which it is mounted, by means of an individual cartridge adjustment tool 76 will now be described.

At a first stage, the individual cartridge adjustment tool 76 is generally radially mounted over a first cartridge 36 mounted on a slotting cutter tool body 38 such that one of the side plates 80 of the frame 78 is located adjacent the cutter front surface 48 and the other side plate 80 is located adjacent the cutter rear surface 50. Thus, as seen in FIGS. 7 to 9, portions of the frame 78 straddle a peripheral portion of the cutter body at this first stage.

At this stage, in order to enable free and undisturbed mounting of the individual cartridge adjustment tool 76 on the slotting cutter tool body 38, all the fixing screws 90 and the threaded adjustment bolts 108 are fully untightened. Practically, that means that the front end 96 of each of the fixing screws 90, and the front end 116 of each of the threaded adjustment bolts 108 may be approximately flush with an inner wall 122 of their associated side plate 80.

Figure 7:
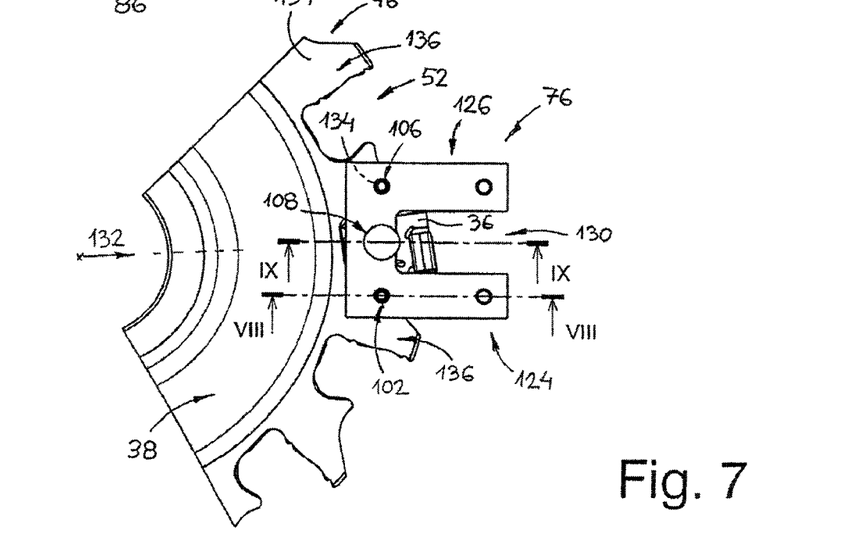
FIG. 7 is a partial end view of a slotting cutter tool body with the cartridge adjustment tool of FIG. 6 mounted thereon in an adjustment position.

The individual cartridge adjustment tool 76, as seen in FIG. 7, is mounted such that the leading pair 102 of fixing screws 90 is mounted at a leading side 124 of the cartridge 36, and the trailing pair 106 of fixing screws 90 is mounted at a trailing side 126 of the cartridge 36.

At a second stage, in order that the individual cartridge adjustment tool 76 will be in the correct position for adjusting the cartridge 36, the front end 116 of the threaded adjustment bolts 108 has to be positioned opposite a force engagement area 128 (much like the force engagement area 64 of the cartridges in FIGS. 2, 4 and 5) of the cartridge 36 (see FIG. 9). In order to observe the correct position of the individual cartridge adjustment tool 76 with respect to the cartridge 36, the frame 78 is provided with a frame aperture 130 in the vicinity of the threaded adjustment bolts 108.

The orientation of the individual cartridge adjustment tool 76 with respect to a radial direction 132 of the slotting cutter tool body 38 may comply with two guidelines. The first guideline is that the front end 116 of the threaded adjustment bolts 108 is positioned opposite a force engagement area 128 of the cartridge 36. The second guideline is that the leading pair 102 of fixing screws 90 as well as the trailing pair 106 of fixing screws 90 are positioned opposite a fixing area 134 of the slotting cutter tool body 38.

A fixing area 134 of the slotting cutter tool body 38 is an area found at the cutter front surface 48 and at the cutter rear surface 50, located between two adjacent cartridge pockets 52, and is capable of securely receiving thereon a front end 96 of a fixing screw 90. Thus, there are multiple such fixing areas. In FIG. 7, one fixing area 134 (shown by a dashed lead line) is hidden by the frame 78, therefore, for demonstration purposes only, another fixing area 134 is shown at the succeeding cutter body portion 136. A cutter body portion 136 is a radially extreme portion of the slotting cutter tool body 38 that is located between two adjacent cartridge pockets 52.

At a third stage, as shown in FIG. 8, all the fixing screws 90 are fully tightened against their associated fixing area 134 on the cutter front surface 48 and on the cutter rear surface 50. In that position, the leading pair 102 of fixing screws 90 is tightened against the cutter body portion 136 preceding the cartridge 36, and the trailing pair 106 of fixing screws 90 is tightened against the cutter body portion 136 succeeding the cartridge 36.

For the convenience of adjustment, it is advantageous that the slotting cutter tool body 38 will be fixed generally centered with respect to the frame opening 86, as seen in FIG. 8.

At a fourth stage, depending on the required direction of displacement of the cartridge 36, a first 138 threaded adjustment bolt 108 (see FIG. 9) is rotated in an inward direction 140 of the frame 78 until its front end 116 comes in contact with the force engagement area 128 of the cartridge 36. At the same time, a second 142 threaded adjustment bolt 108, opposite the first 138 threaded adjustment bolt 108, is not being rotated and is spaced from the adjacent force engagement area 128 of the cartridge 36 in order to enable axial displacement of the cartridge 36.

At that stage, continuing rotating the first 138 threaded adjustment bolt 108 causes axial displacement of the cartridge 36 in a desired direction F. When the desired axial position of the cartridge 36 with respect to the slotting cutter tool body 38 is reached, as observed by an appropriate measurement tool (not shown), the rotation of the first 138 threaded adjustment bolt 108 is stopped.

In case of an over-displacement of the cartridge 36, the cartridge displacing process has to be reversed to the opposite direction. In that case, the first 138 threaded adjustment bolt 108 is loosened a certain amount to enable displacement of the cartridge 36 towards it. Then, the second 142 threaded adjustment bolt 108 is rotated in an inward direction 140 of the frame 78 until it comes in contact with the adjacent force engagement area 128 of the cartridge 36. Further rotation of the second 142 threaded adjustment bolt 108 causes axial displacement of the cartridge 36 with respect to the slotting cutter tool body 38 in the desired direction. When the desired axial position of the cartridge 36 with respect to the slotting cutter tool body 38 is reached, the rotation of the second 142 threaded adjustment bolt 108 is stopped.

At a fifth stage, the cartridge retaining screw 62 (shown in FIGS. 2 and 3), being a cartridge tightening means, is fully tightened thus fixing the axial position of the cartridge 36 with respect to the slotting cutter tool body 38.

Since it is advantageous to use the individual cartridge adjustment tool 76 to adjust a single cartridge 36 on slotting cutter tool bodies having different thickness, it is beneficial to be able to change the frame opening 86. This may be done by changing the size of the frame central portion 82. According to a specific embodiment of the present invention, as shown in FIG. 8, the frame central portion 82 is made of two separate central portion components, namely, a first central portion component 144 and a second central portion component 146. The first central portion component 144 is provided with a first component through bore 148. The second central portion component 146 is provided with a second component threaded bore 150 that is aligned with the first component through bore 148. In order to attach the first central portion component 144 to the second central portion component 146, a central attachment screw 152 is inserted into the first component through bore 148 and threadingly engages the second component threaded bore 150.

If it is desired to increase the frame opening 86, the central attachment screw 152 is disengaged from the second component threaded bore 150 and removed from the first component through bore 148. Then, the first and second central portion components 144, 146 may be separated from each other.

At this stage, a complementary central portion (not shown in the figures), provided with a matching bore, is inserted between the first and second central portion components 144, 146. Then, another central attachment screw is inserted through the first component through bore 148, through the matching bore, and threadingly engages the second component threaded bore 150. Thus, an individual cartridge adjustment tool having a larger frame opening is received.

It can also be seen from the foregoing, that one may use both tools to align cartridges mounted on a single slotting cutter tool body. For instance, the individual cartridge adjustment tool 76 may be used first to axially position one or more of the cartridges, to thereby fix the axial position of one or more such "reference" cartridges. Then, the cartridge adjustment tool 10 may be mounted on one side of the cutter body to axially align the other cartridges with the fixed reference cartridge(s).

Although the present invention has been described to a certain degree of particularity, it should be understood that various alterations and modifications could be made without departing from the spirit or scope of the invention as hereinafter claimed.

The disc-like cartridge adjustment tool does not have to be formed with a through bore or even with a bore that is coaxial with its axis of rotation. Thus, if the disc-like cartridge adjustment tool is formed without a central bore, it may be attached to the slotting cutter by means of clams, or, by magnetic means (not shown).

The adjustment elements do not have to be threadingly coupled to the cartridge adjustment tool, and they may be pushed by a sliding wedge or other adjustable means (not shown).

The adjustment element of the individual cartridge adjustment tool does not have to be threadingly coupled to the frame of the cartridge adjustment tool, and it may be pushed by a sliding wedge or other adjustable means (not shown).

The cartridge adjustment tool does not have to be attached, by means of screws, to both sides of the slotting cutter. Rather, it may be attached to only one side of the slotting cutter by means of, for example, magnetic means.

What is claimed is:

1. A method for axially aligning each of a plurality of cartridges mounted on a slotting cutter tool body, the method comprising:
    (a) mounting a cartridge adjustment tool coaxially with the slotting cutter tool body;
    (b) arranging the cartridge adjustment tool relative to the slotting cutter tool body such that each of a plurality of adjustment elements coupled to a body of the cartridge adjustment tool opposes a force engagement area belonging to a corresponding cartridge;
    (c) axially displacing a given adjustment element to exert a force on the force engagement area of a corresponding cartridge to thereby urge said corresponding cartridge towards a desired location;
    (d) tightening said corresponding cartridge, once said one corresponding cartridge reaches said desired location; and
    (e) repeating steps (c) and (d) for the remaining cartridges.

2. The method of claim 1, further comprising:
    between steps (d) and (e), rotating together the slotting cutter tool body and the cartridge adjustment tool by an angle corresponding to an angular displacement between two succeeding cartridges.

3. A method for axially positioning a cartridge mounted on a slotting cutter tool body which has a cutter axis of rotation, a cutter periphery, a cutter front surface and a cutter rear surface, the method comprising:
    (a) providing a cartridge adjustment tool comprising:
        a frame having spaced apart portions defining a frame opening therebetween; and
        at least one adjustment element coupled to the frame and protruding into said frame opening;
    (b) mounting the cartridge adjustment tool on the slotting cutter tool body such that the frame straddles at least a portion of the cutter periphery and the at least one adjustment element is opposite a force engagement area of the cartridge to be axially positioned;
    (c) fixing the cartridge adjustment tool frame to the slotting cutter tool body by tightening one or more fixing screws provided on said spaced apart portions;
    (d) axially displacing the at least one adjustment element to exert a force on the force engagement area of the cartridge to thereby axially urge said cartridge towards a desired location; and
    (e) tightening said cartridge, once said cartridge reaches said desired location.

4. A method for axially aligning each of a plurality of cartridges mounted on a slotting cutter tool body which has a cutter axis of rotation, a cutter periphery, a cutter front surface and a cutter rear surface, the method comprising:
    axially positioning at least one of said plurality of cartridges using a first cartridge adjustment tool which, during use, straddles at least a peripheral portion of the cutter periphery; and
    axially aligning others of said plurality of cartridges using a second cartridge adjustment tool which, during use, is mounted on a first side of the cutter tool body.

5. A cartridge adjustment tool in combination with a slotting cutter tool body which has a cutter axis of rotation, a cutter periphery, a cutter front surface and a cutter rear surface, wherein:
    the cartridge adjustment tool comprises:
        a body having a body axis of rotation and a body peripheral surface extending between a body front surface and a body rear surface;
        at least one bore formed through the body; and
        a plurality of threaded adjustment elements threadingly coupled to the body in the vicinity of the body peripheral surface, each threaded adjustment element being independently axially adjustable relative to the body and having a front end capable of protruding axially forwardly with respect to the body front surface;
    the cartridge adjustment tool and the slotting cutter tool body are coaxially mounted on an arbor with the body front surface facing said slotting cutter tool body; and
    the cartridge adjustment tool is mounted on the arbor via the bore.

6. A cartridge adjustment tool in combination with a slotting cutter tool body which has a cutter axis of rotation, a cutter periphery, a cutter front surface and a cutter rear surface, wherein:
    the cartridge adjustment tool comprises:
        a frame having spaced apart portions defining a frame opening therebetween; and
        at least one threaded adjustment element threadingly coupled to the frame and protruding into said frame opening, the at least one threaded adjustment element arranged to travel along a direction defined between the spaced apart portions;
    the frame straddles at least a portion of the cutter periphery; and
    the spaced apart portions are secured to the cutter front surface and cutter rear surface.

* * * * *